US008635041B2

(12) United States Patent
Golparian et al.

(10) Patent No.: US 8,635,041 B2
(45) Date of Patent: Jan. 21, 2014

(54) SYNCHRONIZING A SEISMIC DATA ACQUISITION NETWORK

(75) Inventors: Daniel Golparian, Tokyo (JP); Anh Duc Dao, Oslo (NO)

(73) Assignee: WesternGeo L.L.C., Houston, TX (US)

( * ) Notice: Subject to any disclaimer, the term of this patent is extended or adjusted under 35 U.S.C. 154(b) by 414 days.

(21) Appl. No.: 12/482,805

(22) Filed: Jun. 11, 2009

(65) Prior Publication Data
US 2010/0318299 A1  Dec. 16, 2010

(51) Int. Cl.
| G04C 11/00 | (2006.01) |
| G01V 1/00 | (2006.01) |
| G01D 18/00 | (2006.01) |

(52) U.S. Cl.
USPC .................. 702/89; 702/14; 702/125; 367/51

(58) Field of Classification Search
USPC ........................................................... 702/14
See application file for complete search history.

(56) References Cited

U.S. PATENT DOCUMENTS

| 5,537,653 | A | 7/1996 | Bianchini, Jr. |
| 5,870,441 | A * | 2/1999 | Cotton et al. ................. 375/354 |
| 6,665,316 | B1 * | 12/2003 | Eidson ........................... 370/509 |
| 7,216,289 | B2 | 5/2007 | Kagle et al. |
| 7,269,095 | B2 * | 9/2007 | Chamberlain et al. .......... 367/76 |
| 2003/0043693 | A1 * | 3/2003 | Eastwood et al. ............... 367/41 |
| 2004/0105341 | A1 * | 6/2004 | Chamberlain et al. .......... 367/21 |
| 2005/0047275 | A1 | 3/2005 | Chamberlain et al. |
| 2006/0009911 | A1 * | 1/2006 | Burkholder et al. ............ 702/18 |
| 2006/0080575 | A1 | 4/2006 | Golparian |
| 2008/0189044 | A1 * | 8/2008 | Chamberlain et al. .......... 702/14 |

FOREIGN PATENT DOCUMENTS

GB          2395640 A          5/2004

OTHER PUBLICATIONS

PCT Search Report, dated Jan. 28, 2011, Application No. PCT/US2010/038089.

* cited by examiner

*Primary Examiner* — Sujoy Kundu
*Assistant Examiner* — Regis Betsch (57) ABSTRACT

Described herein are implementations of various technologies for a method for configuring a seismic data acquisition network. A first message may be received from a first node of the seismic data acquisition network over a first direct communication link. The first message may comprise a first precision quality of a first reference clock to which the first node may be synchronized. A second message may be received from a second node of the seismic data acquisition network over a second direct communication link. The second message may comprise a second precision quality of a second reference clock to which the second node may be synchronized. One of the first precision quality and the second precision quality may be determined to have a higher precision quality. A real time clock may be synchronized to one of the first reference clock and second reference clock having the higher precision quality.

20 Claims, 7 Drawing Sheets

SYNCHRONIZING A SEISMIC DATA ACQUISITION NETWORK

BACKGROUND

1. Field of the Invention

Implementations of various technologies described herein generally relate to methods and systems for synchronizing a seismic data acquisition network.

2. Description of the Related Art

The following descriptions and examples are not admitted to be prior art by virtue of their inclusion within this section.

Typically, seismic surveys may be performed for the purpose of geotechnical projects, such as hydrocarbon exploration. To perform the seismic survey, a survey system may be deployed that produces and records seismic data about a survey area.

The survey system includes a seismic data acquisition network. Typically, the network exchanges communications between sensors, concentrators and a recording truck. The sensors and concentrators are also referred to herein as nodes. Each of the nodes may include a real-time clock that provides the times of survey events which are used for seismic data processing.

A real-time clock (RTC) is a computer clock (most often in the form of an integrated circuit) that keeps track of the local time. Although the term RTC often refers to the devices in personal computers, RTCs are present in almost any electronic device which keeps time.

Typically, RTCs drift, which may introduce timing errors to the seismic data processing. As such, it may be desirable to synchronize the RTCs in the network. A reference clock may be used for the synchronization. The reference clock is a clock with a pre-defined precision. By synchronizing the RTCs with the reference clock, timing errors may be limited to a range that is acceptable for the seismic data processing.

Usually, the reference clock is placed on a recording truck. The recording truck may periodically send packets of data containing the reference clock time to some of the nodes. These nodes may adjust the values of their RTCs according to the time value of the reference clock included in the data packets. Now synchronized, these nodes may then synchronize other nodes in the same fashion.

The relationship between the nodes may be described by labeling nodes as masters and slaves. It should be noted that a single node may be both a master and a slave. For example, a node A may be a slave to node B, but a master to node C. In such a case, node A adjusts node A's RTC to the time value received from node B. Similarly, node C adjusts node C's RTC to the time value received from node A.

SUMMARY

Described herein are implementations of various technologies for configuring a seismic data acquisition network. In one implementation, a first message may be received from a first node of the seismic data acquisition network over a first direct communication link. The first message may include a first precision quality of a first reference clock to which the first node may be synchronized. A second message may be received from a second node of the seismic data acquisition network over a second direct communication link. The second message may include a second precision quality of a second reference clock to which the second node may be synchronized. One of the first precision quality and the second precision quality may be determined to have a higher precision quality. A real time clock may be synchronized to one of the first reference clock and second reference clock having the higher precision quality. The first node and the second node may be seismic sensors or seismic data acquisition network concentrators.

In another implementation, the first precision quality and the second precision quality may be based on a parts-per-million (PPM) accuracy. In a scenario where the PPM accuracies of the first and second precision qualities are equal, the first precision quality and the second precision quality may be further based on a number of nodes between the first or second node, and a node containing the real time clock. In another implementation, the first and second precision qualities may be further based on a unique identifier of the first and second nodes, such as a serial number.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

One or more implementations of various techniques for synchronizing a seismic data acquisition network will now be described in more detail with reference to FIGS. 1-6 in the following paragraphs.

Figure 1:
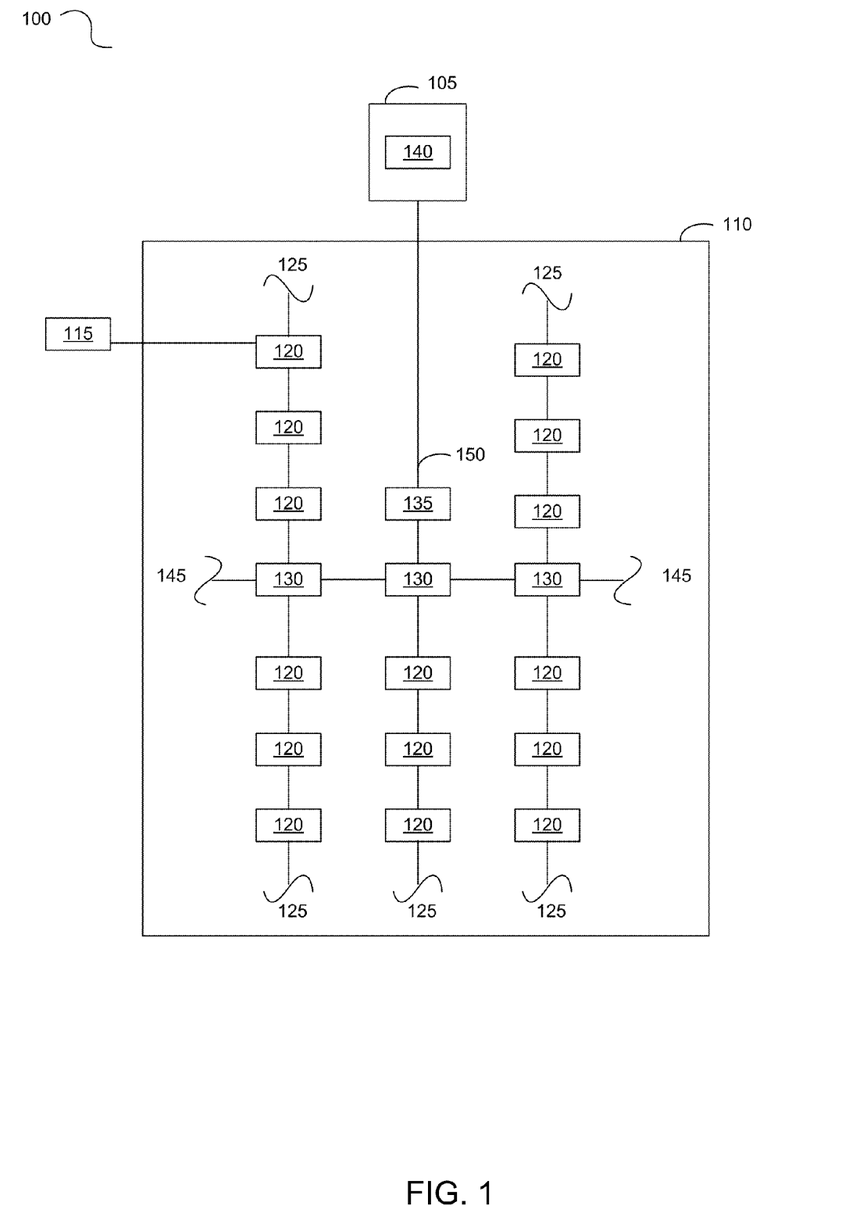
FIG. 1 illustrates a land-based survey system in accordance with one or more implementations described herein.

FIG. 1 illustrates a land-based survey system 100 in accordance with one or more implementations described herein. The system 100 may include a seismic source 115, a recording truck 105, and a seismic data acquisition network 110. The recording truck 105 may be connected to the seismic data acquisition network 110.

The seismic data acquisition network 110 may include a plurality of seismic receivers 120. The seismic receivers 120 may include sources of seismic data, such as, positioning sensors, e.g., Global Positioning System (GPS) sensors, seismic sensors, e.g., geophones, on a plurality of lines 125.

The seismic data acquisition network 110 may also include a line 145 with plurality of concentrators 130. The concentrators 130 may be connected to at least one router 135, whose function will be discussed in greater detail below. The seismic survey system 100 may also include at least one data collection system 140 on the recording truck 105. In one implementation, the system 100 may include multiple data collection systems 140. Each of the data collection system 140, the router 135, the concentrators 130, and the receivers 120 may be assigned a unique, network address in accordance with a network protocol administered by the data collection system 140.

In one implementation, the concentrators 130 may be connected by means of a medium-bandwidth, IP-based network. The concentrators 130 may be intelligent units, capable of both initiating and participating in communication sessions with other concentrators 130 and with the data collection system 140. The concentrators 130 may be connected with other neighboring concentrators 130. A number of concentrators 130 may be connected together, forming a string of concentrators 130, as will be discussed further below.

The router 135 may be a computing device that connects multiple networks 110, multiple data collection systems 140, even multiple routers 135 together. The seismic receivers 120 may package data into packets (not shown), each of which contains not only data, but a variety of other information.

Some of this information may include a header of the packet. The header may contain the network address of a destination for the packet, e.g., the data collection system 140. The router 135 may use the information in the headers of the packets from the seismic receivers 120 and a lookup table (not shown) stored on router 135 to determine the packet's destination. The router 135 may then communicate with other routers 135 to determine the best path to that destination through the seismic data acquisition network 110 as a whole.

In one implementation, the routers 135 may communicate with each other using a protocol, such as, the Open Shortest Pass First (OSPF). In another implementation, the protocol used may be the Internet Control Message Protocol (ICMP). The ICMP is an extension to the IP protocol suite. Thus, the router 135 may behave as a standard IP network router, routing traffic to and from the receivers 120 connected to the router 135, as well as traffic to and from the other routers 135 connected to it.

The connections among the seismic receivers 120, concentrators 130, the router 135, and the data collection system 140 may be configured to accommodate the amount of network traffic expected to be traveling thereon. In one implementation, the lines 125, 145 may be medium-bandwidth data paths. In such an implementation, the connection 150 may be a high-bandwidth data path, also known as a backbone.

In one implementation, the connection 150 and the lines 125, 145 may be electrical. For example, twisted wire pairs and shielded coaxial cables might be employed in various implementations.

In another implementation, the connection 150 and lines 125, 145 may include optical fibers, or a wireless system. The precise parameters regarding the bandwidth of the lines 125, 145 and connection 150 may be implementation specific, depending on the number of nodes, the particular protocol implemented, and the structure of the seismic data acquisition network 110.

One reference clock may not be sufficient to synchronize the seismic data acquisition network 110. Synchronization error may accumulate as the distance from a node to the reference clock increases. Nodes far from the reference clock may have timing errors due to limited range.

The network 110 may also include low quality communication links, such as wireless links, which may prevent synchronization over these links. One reference clock on one side of such link may not synchronize the node on the other side of the link. If the node is a gateway to a sub-network, the sub-network may be left out of synchronization.

In one implementation, many reference clocks may be distributed in the network 110, enabling all the nodes to be synchronized by more than one reference clock. Furthermore, the network 110 may be dynamic and the minimum number of necessary reference clocks may not be known in advance. In such an implementation, redundant reference clocks may be deactivated to save network power consumption.

Figure 2:
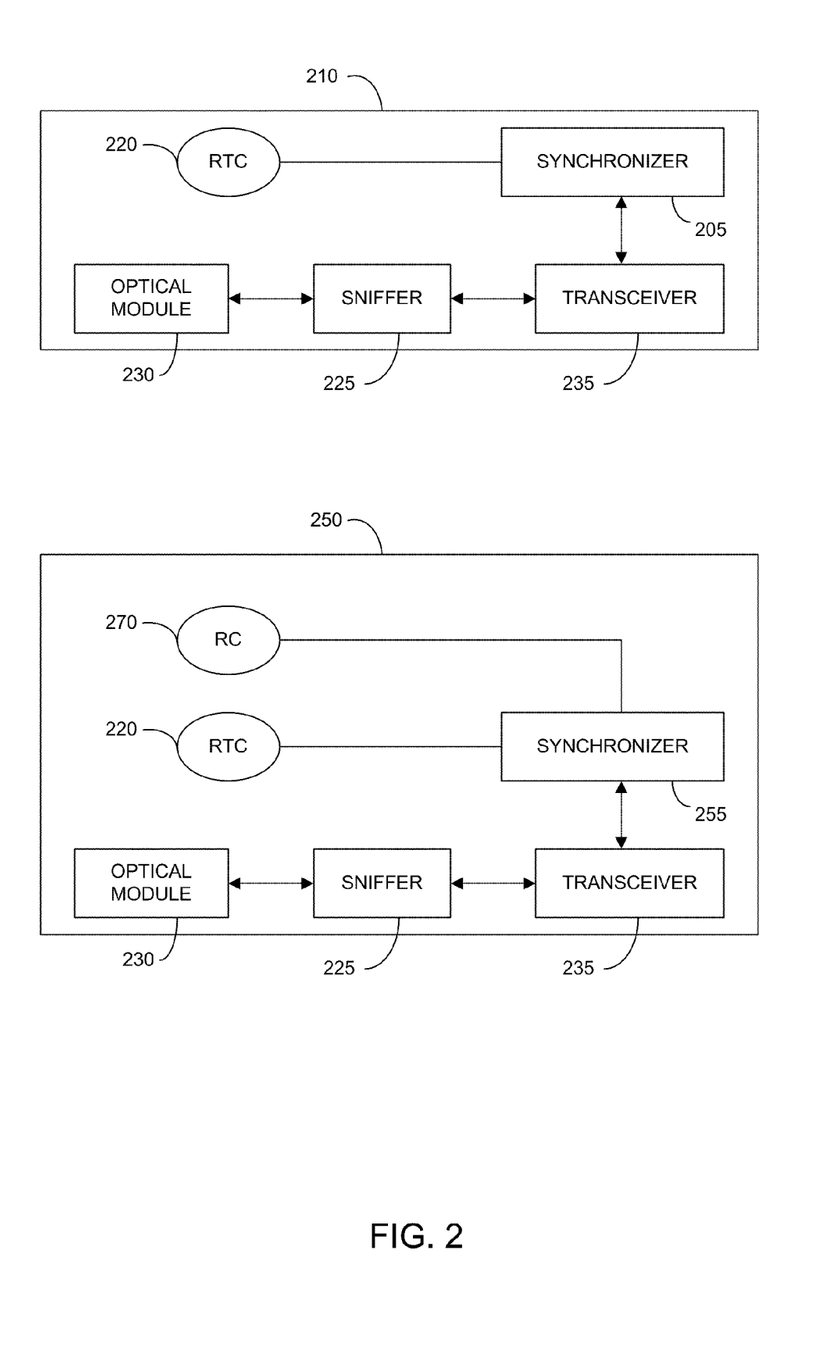
FIG. 2 illustrates a node and a source node in accordance with implementations described herein.

FIG. 2 illustrates a node 210 and a source node 250 in accordance with implementations described herein. Each of the router 135, the concentrators 130, and the receivers 120 is also referred to herein as a node 210 of the network 110.

The node 210 may include a sniffer 225, an optical module 230, a transceiver 235, a RTC 220, and a synchronizer 205. The optical module 230 may be configured to convert optical signals received from the network 110 to electrical signals. Additionally, the optical module 230 may convert electrical signals to be transmitted over the network 110 to optical signals. The optical module 230 may be communicably linked to the transceiver 235 via the sniffer 225.

As shown, the sniffer 225 may monitor data between the optical module 230 and the transceiver 235. Alternatively, the sniffer 225 may be positioned between the transceiver 235 and the synchronizer 205 to monitor data between the transceiver 235 and the synchronizer 205. In some implementations, the location of the sniffer 225 within the node 210 may vary. The sniffer may monitor link quality for synchronization purpose. The sniffer may determine if a hardware synchronization technique may be performed on the direct link. In one implementation, the sniffer may measure link propagation delay. If the sniffer observes a constant propagation delay, the sniffer may calculate high precision time drift between two RTCs located on two sides of the link.

The RTC 220 may be configured to keep track of time even when the node 140 is turned off. Typically, the RTC 220 runs on a special battery that is not connected to the power supply (not shown) for the node 210.

The source node 250 may be a specialized node 210 that also contains a reference clock 270. As stated previously, the reference clock 270 may be a clock with a pre-defined precision that may be used to keep the nodes 210, 250 synchronized. The source node 250 also contains a synchronizer 255 instead of a synchronizer 205. The synchronizer 255 may perform functionality in addition to that of the synchronizer 205 described below.

The synchronizer 205 may synchronize the node 210 to the source node 250. The node 210 may be synchronized to the source node 250 when the RTC 220 is set to a time within a predetermined range of the reference clock 270. The RTC 220 of the source node 250 may also be synchronized: either to the source node's own reference clock 270, or that of another source node 250.

While the following discussion describes synchronization with reference to the node 210 being synchronized, it should be understood that the functionality may also be applied to synchronization of the source node 250.

The synchronizer 205 may send a synchronization message to the immediate neighbors of the node 210. The synchronization message may be data packets with a time value of the reference clock 270 to which the node 210 may be synchronized. The immediate neighbors are all the nodes 210 and source nodes 250 with a direct communication link to the node 210 that is sending the synchronization message.

Accordingly, the synchronizer 205 may receive synchronization messages from the node's immediate neighbors. If the immediate neighbors are synchronized to different reference clocks 270, the synchronizer 205 may perform a comparison between the different reference clocks 270 referred to in the synchronization messages. In comparing the reference clocks, the synchronizer 205 may select one reference clock 270 to which the node 210 may be synchronized.

In one implementation, the synchronization messages may also include a value that indicates the precision quality of the reference clock 270. For example, the precision of GPS clocks and atomic clocks may be indicated in parts-per-million, where a lower parts-per-million precision indicates a higher precision quality. In one implementation, RTC 220 of the node 210 that receives the synchronization messages may be synchronized to the reference clock 270 with the higher precision quality.

In another implementation, the precision quality may be further based on a propagation delay between the source nodes 250 and the nodes 210 that receive the synchronization messages. As the synchronization messages are passed from the source nodes 250 to the nodes 210, a propagation delay may be incurred. The propagation delay may be the time that the synchronization messages take to travel from the source node 250 to the other nodes 210 of the system. The greater the propagation delay, the more difficult it becomes to maintain synchronization with the reference clocks 270 of the source nodes 250.

Accordingly, the synchronization messages may also include the propagation delay. In one implementation, the propagation delay may be indicated by a number of nodes between the source nodes 250 and the node 210 that receives the synchronization message.

When two reference clocks 270 have the same precision, the propagation delay may be used to determine which reference clock 270 selected for the synchronization. In one implementation, a formula that assigns weights to the precision and the propagation delay may be used to select between the reference clocks 270.

As stated previously, the synchronizer 255 may perform all the same functions as the synchronizer 205. Additionally, however, the synchronizer 255 may activate or deactivate its reference clock.

The source nodes 250 may be a master and/or a slave node. When the synchronizer 255 receives a synchronization message, the synchronizer may compare the precision of its own reference clock 270 and the reference clock 270 to which the neighbor node is synchronized. If its own reference clock 270 does not have the higher precision quality, the source node 250 may become a slave node. Source nodes 250 that become slave nodes may turn off their own reference clocks 270. Advantageously, by turning off their reference clocks 270, power consumption may be conserved on the network 110.

Figure 3:
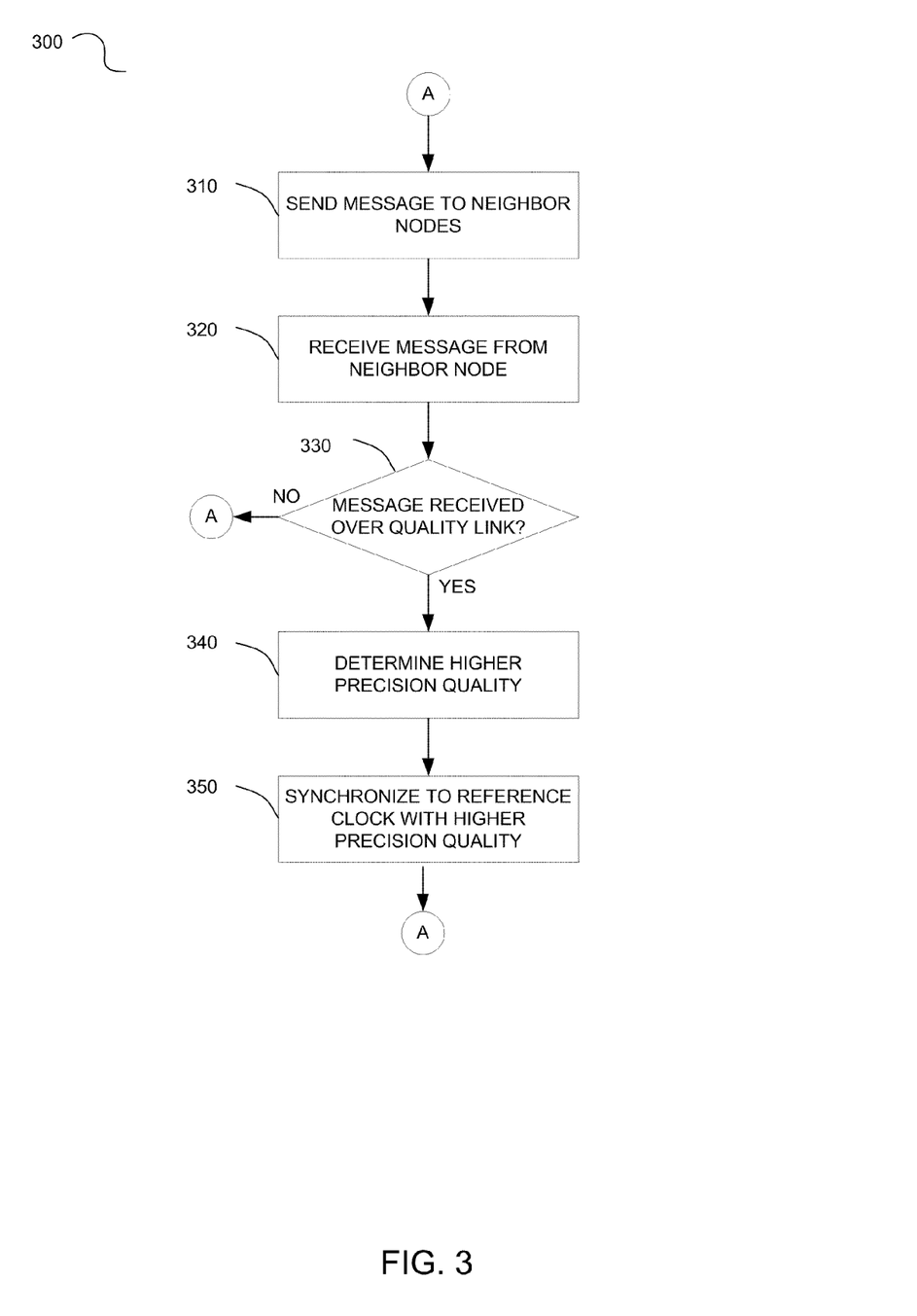
FIG. 3 illustrates a flow chart of a method for synchronizing a node in accordance with implementations described herein.
Figure 4:
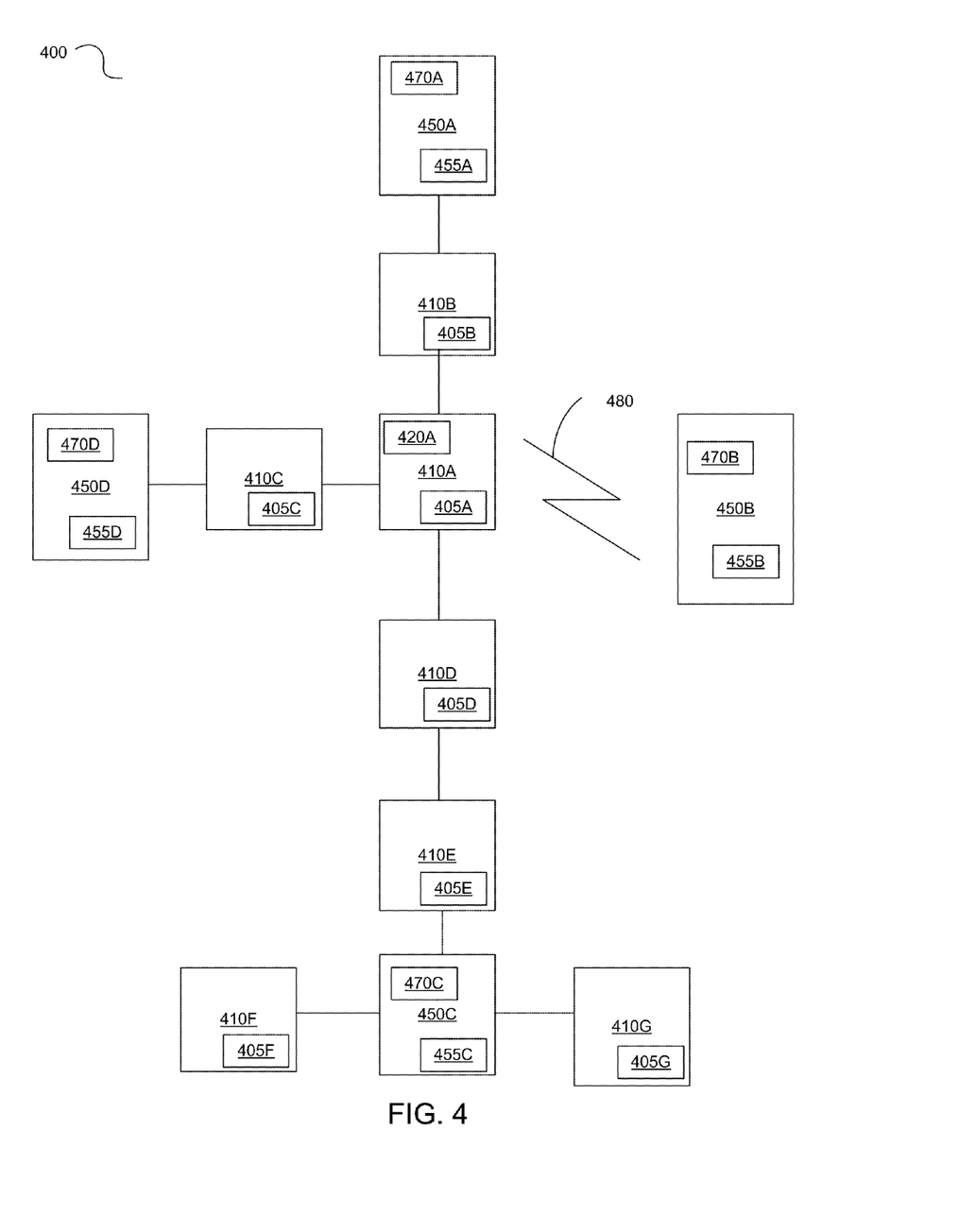
FIG. 4 illustrates a seismic data acquisition network in accordance with implementations described herein

FIG. 3 will be described with reference to FIG. 4, which illustrates a seismic data acquisition network 400 in accordance with implementations described herein. The network 400 contains nodes 410 and source nodes 450 connected over direct communication links.

FIG. 3 illustrates a flow chart of a method 300 for synchronizing the node 410 in accordance with implementations described herein. It should be understood that while the flow chart indicates a particular order of execution, in some implementations, certain steps of method 300 may be executed in a different order.

Method 300 will be described with further reference to a node 410A. Specifically, a synchronizer 405A of the node 410A may perform method 300. As shown, the node 410A contains a synchronizer 405A and a RTC 420A. Additionally, the source nodes 450A, 450B, 450C and 450D respectively contain reference clocks 470A, 470B, 470C and 470D and synchronizers 455A, 455B, 455C, and 455D.

At step 310, the synchronizer 405A may send the synchronization message to neighboring nodes of the node 410A. As stated previously, the neighboring nodes of the node 410A are all the nodes 410 and source nodes 450 with a direct communication link to the node 410A. As shown in FIG. 4, the nodes with direct communication links to the node 410A are nodes 410B, 410C, 410D, and source node 450B.

As stated previously, the synchronization message may include a precision quality. In one implementation, the precision quality may be a parts-per-million (ppm) precision of the reference clock 470 to which the RTC 420A is synchronized. PPM indicates precision inversely. In other words, the fewer the ppm precision, the more accurate the reference clock 470 is. In another implementation, the precision quality may include the ppm precision and a distance to the source node 450 that contains the reference clock 470 with the specified ppm precision.

The synchronizers 405B, 405C, 405D, and 455B of the neighbor nodes may each send synchronization messages to the synchronizer 405A. Accordingly, at step 320, the synchronizer 405A may receive synchronization messages from the synchronizers 405B, 405C, 405D, and 455B of the neighbor nodes.

The synchronizer 405A may perform the steps 330-350 for each synchronization message received. At step 330, the synchronizer 405A may determine whether the synchronization message is received over a quality link. The quality link may be a direct communication link between nodes that has a deterministic delay. For example, a fiber-optic link may provide a deterministic delay. However, a wireless connection, such as the connection 480, may have a variable delay. As such, the synchronizers 405 may not be able to keep their nodes 410 synchronized to reference clocks 470 that are in communication over wireless connections. Because the wireless connection 480 has a variable delay, the wireless connection 480 may not be a quality link. As such, for the synchronization message from the synchronizer 455B, method 300 may return to the step 310. The quality link may be a direct communication link between nodes such that the number of nodes between the source nodes 450 to which the sender is synchronized and the node 410 that receives the synchronization message is less than a predetermined range. The predetermined range, also referred to herein as a broadcast range, may be based on the precision of the source node's reference clock 470. In other words, the more precise the reference clock 470, the greater the broadcast range.

If the synchronization message is received over a quality link, method 300 continues to step 340. As stated previously, the synchronization message may include precision quality. The precision quality may be a ppm of the reference clock 470 to which the node 410 sending the synchronization message is synchronized.

At step 340, the synchronizer 405A may determine a higher precision quality. It should be noted that the node 410A is either synchronized or not synchronized. A synchronized node 410A may be synchronized to the reference clock 470 having the precision quality included in a previous synchronization message. As such, the synchronizer 405A may determine the higher precision quality of those included in the current and previous synchronization messages.

If the node 410A is not synchronized, there may not be a previous synchronization message. As such, the higher precision quality may be the precision quality included in the current synchronization message. At step 350, the synchronizer 405A may synchronize the node 410A to the reference clock 470 having the higher precision quality.

As stated previously, in one implementation, the precision quality may include the ppm precision and the distance to the source node 450 that contains the reference clock 470 with the specified ppm precision. In such an implementation, if there are two different reference clocks 470 with the same ppm precision, but one is closer to the node 410A than the other, the synchronizer 405A may synchronize to the reference clock 470 on the closer source node 450.

For example, node 410A may receive two synchronization messages: one that includes the precision quality of the reference clock 470A, the other may include the precision quality of the reference clock 470C. If the ppm precisions of the reference clocks 470A, 470C are equal, the synchronizer 405A may compare the distances to the nodes 410 containing the reference clocks 470A, 470C. As shown, there are 2 nodes 410 between the source node 450C and the node 410A. However, there is only one node 410 between the source node 450A and the node 410A. As such, the synchronizer 405A may synchronize the RTC 420A to the reference clock 470A, which is on the closer source node 450A.

In a scenario where the source nodes 450 are equidistant from the node 410A, the synchronizer 405A may synchronize to the reference clock 470 with the lower ppm precision. As stated previously, the lower the ppm precision, the more accurate the reference clock 470 is. For example, the two synchronization messages may be for the reference clocks 470A and 470D, which have only one node 410 between them and the node 410A. As such, the synchronizer 405A may synchronize to the reference clock 470 having the lower ppm precision.

If the precisions are the same, and the distances are the same, the higher precision quality may be chosen randomly. In one implementation, the synchronizer 405A may determine the higher precision quality based on the unique identifiers of the nodes 410, 450 sending the synchronization messages. The unique identifiers are numerical values assigned to nodes so that two nodes never have a same identifier. They may be serial numbers assigned at the production. They may also be IP addresses of the nodes. However, IP addresses may not be assigned yet at system start up. After step 350, method 300 returns to step 310.

Figure 5A:
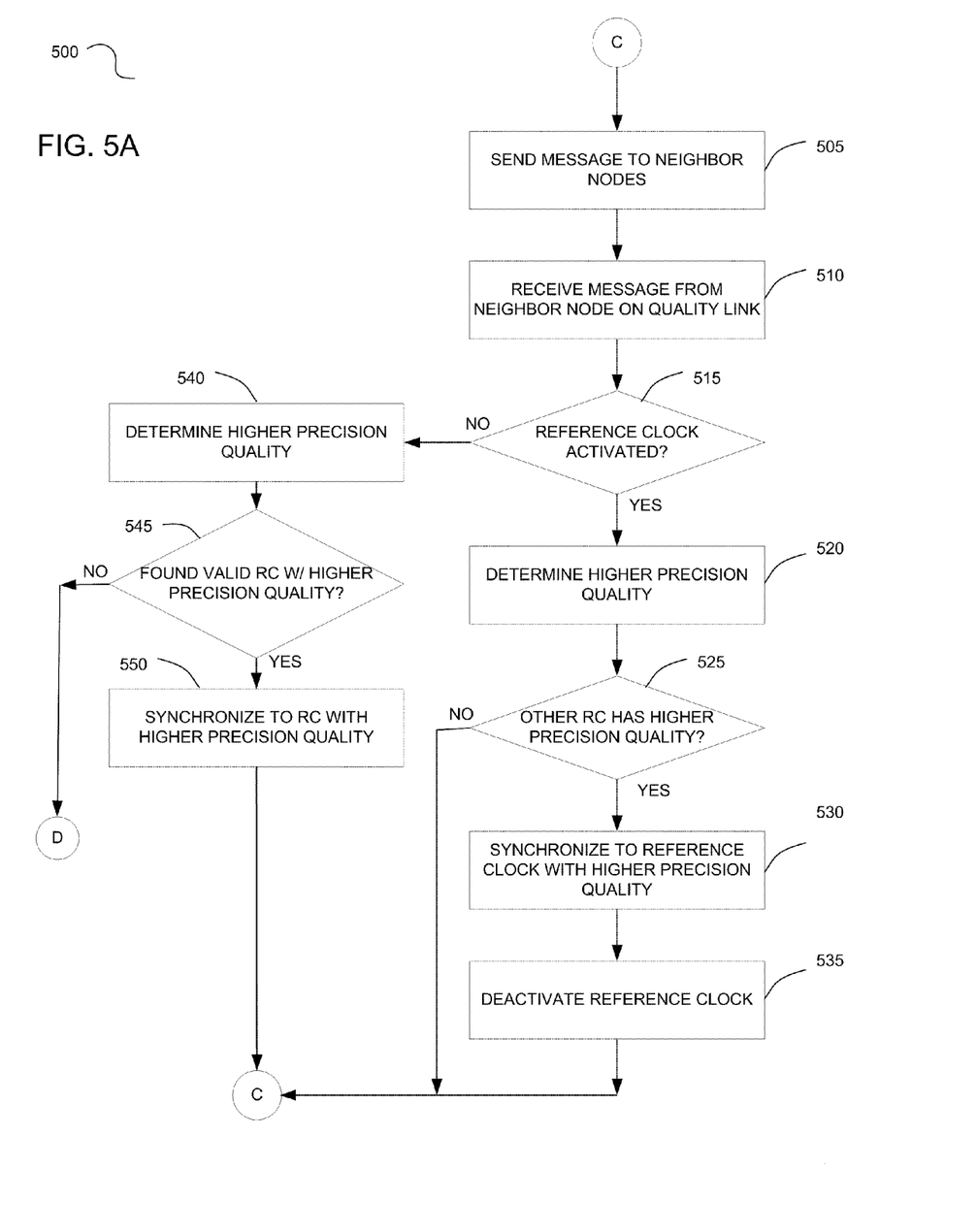
FIGS. 5A-5B illustrate flow charts of a method for synchronizing a seismic data acquisition network in accordance with implementations described herein.
Figure 5B:
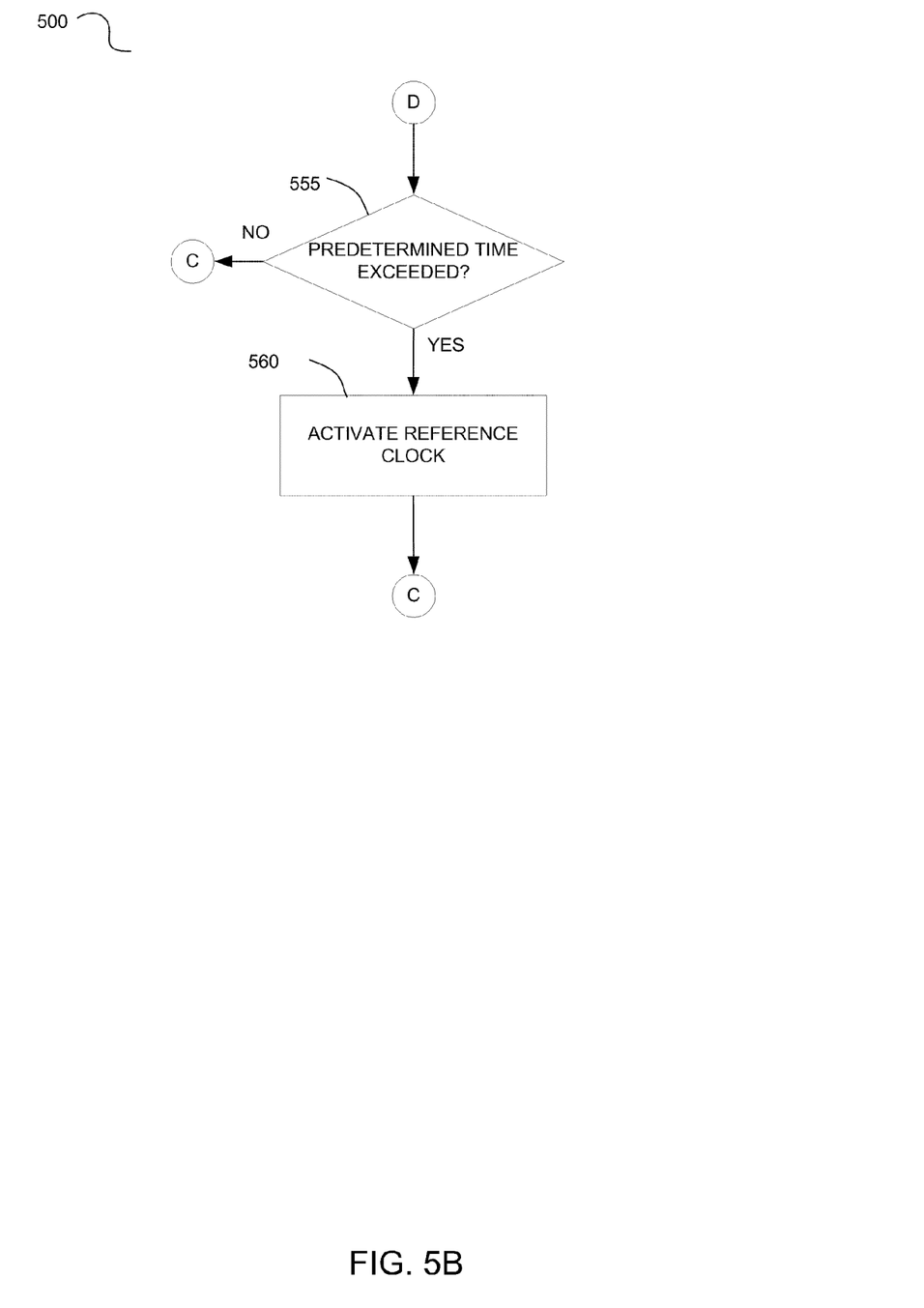

FIGS. 5A-5B illustrate flow charts of a method 500 for synchronizing a seismic data acquisition network 400 in accordance with implementations described herein. It should be understood that while the flow chart indicates a particular order of execution, in some implementations, certain steps of method 500 may be executed in a different order.

For the purpose of clarity, method 500 will be described with reference to FIG. 4, specifically, the synchronizer 455C. However, method 500 may be performed by the synchronizers 455A, 455B, 455C, and 455D.

At step 505, the synchronizer 455C may send a synchronization message to synchronizers 405E, 405F, and 405G. The synchronization message may include the precision quality of the reference clock 470C.

At step 510, the synchronizer 455C may receive synchronization messages from the synchronizers 405E, 405F, and 405G of the neighbor nodes. The synchronization messages received may include the precision qualities of the reference clocks 470 to which each of the neighbor nodes is synchronized. The synchronizer 455C may only process messages coming from quality links.

Steps 515-560 may be performed for each synchronization message received. At step 515, the synchronizer 455C may determine whether the reference clock 470C is activated. At the time the source node 450C is powered on, the reference clock 470C may not be activated. Instead of activating the reference clock 470C when powering on, the synchronizer 455C may wait for a predetermined period to synchronize the node 450C to another reference clock 470. Advantageously, waiting for a predetermined period to activate the reference clock 470C may conserve energy for the network 400 because it may limit the number of active reference clocks 470 on the network 400.

If the reference clock 470C is not activated, the flow continues to step 540. At step 540, the synchronizer 455C may determine a higher precision quality among those of the reference clocks 470 to which the neighbor nodes sending the synchronization message are synchronized.

At step 545, the synchronizer 455C may determine whether it finds a reference clock 470 to which a neighbor node is synchronized with the highest precision quality. All of its neighbors may not be synchronized yet to any reference clock. A neighbor may be synchronized but the neighbor may be on a non quality link with the synchronizer 455C. If the synchronizer 455C finds a highest precision quality reference clock 470, the flow may continue to step 550. At step 550, the synchronizer 455C may synchronize the node 450C to the reference clock 470 to which the neighbor node sending the synchronization message is synchronized. The flow may then return to step 505.

If the synchronizer 455C does not find a reference clock, the flow may continue to step 555, illustrated in FIG. 5B. The synchronizer is now unsynchronized.

If, at step 515, the synchronizer 455C determines that the reference clock 470C is activated, the flow continues to step 520. At step 520, the synchronizer 455C may determine a higher precision quality between that of the reference clock 470C and that of the reference clock 470 to which the neighbor node sending the synchronization message is synchronized.

At step 525, the synchronizer 455C may determine whether the reference clock 470 to which the neighbor node is synchronized has the higher precision quality. If the reference clock 470 to which the neighbor node is synchronized has the higher precision quality, the flow may continue to step 530.

At step 530, the synchronizer 455C may synchronize the node 450C to the reference clock 470 to which the neighbor node sending the synchronization message is synchronized. Because the node 470C is synchronized to another reference clock, the reference clock 470C may be deactivated. Accordingly, at step 535, the synchronizer 455C may deactivate the reference clock 470C. The flow may then return to step 505.

If the reference clock 470C to which the neighbor node is synchronized does not have the higher precision quality, the flow may return to step 505.

If, at the end of that predetermined period, the node 470C is not synchronized, the reference clock 470C may be activated, as described below. Accordingly, at step 555, the synchronizer 455C may determine whether a predetermined time is exceeded. The predetermined time may be the predetermined period described above. If the predetermined time is not exceeded, the flow may return to step 505.

If the predetermined time is exceeded, the flow may continue to step 560. At step 560, the synchronizer 455C may activate the reference clock 470C. Additionally, the synchronizer 455C may synchronize the node 450C to the reference clock 470C.

Figure 6:
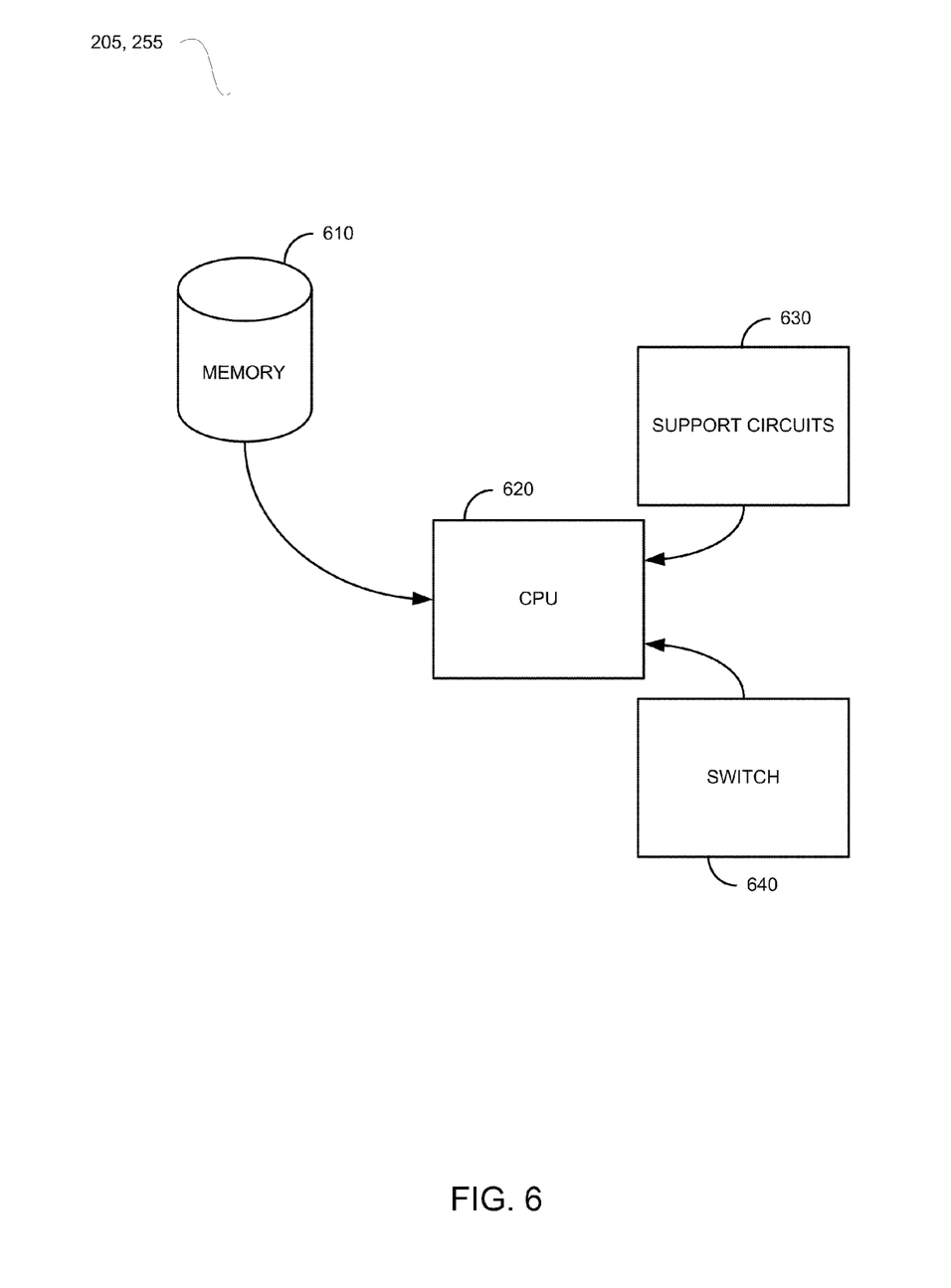
FIG. 6 illustrates synchronizers into which implementations of various technologies described herein may be implemented.

FIG. 6 illustrates synchronizers 205, 255, into which implementations of various technologies described herein may be implemented. The synchronizer 205, 255 may include one or more memory devices 610, central processing units (CPUs) 620, support circuits 630, and switches 640. The switch 640 may be coupled to the transceiver 235. The support circuits 630 may be well-known circuits that include cache, power supplies, input/output interface circuitry, and the like.

The CPU 620 may be in communication with the support circuits 630, the switch 640, and the memory device 610. The memory devices 610 may include conventional hard disk drives, and as such, will be implemented by way of a local area network or by remote access. The memory device 610 may be used to store any and all of the program instructions, sensor data, device data, and results as desired.

In one implementation, messages sent to and received from the nodes 210, 250 may be stored in memory device 610. The CPU 620 may retrieve the appropriate data from the memory device 610 to process data according to program instructions that correspond to implementations of various technologies described herein. The program instructions may be written in a computer programming language, such as C++, Java and the like. The program instructions may be stored in a computer-readable medium. Computer-readable media may include computer storage media and communication media.

Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the CPU 620.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for configuring a seismic data acquisition network, comprising:
    receiving a first synchronization message from a first neighbor node of the seismic data acquisition network over a first direct communication link that allows for bidirectional communication of synchronization messages, wherein the first synchronization message comprises a first accuracy quality of a first reference clock to which the first neighbor node is synchronized;
    receiving a second synchronization message from a second neighbor node of the seismic data acquisition network over a second direct communication link that allows for bidirectional communication of synchronization messages, wherein the second synchronization message comprises a second accuracy quality of a second reference clock to which the second neighbor node is synchronized;
    comparing the first accuracy quality with the second accuracy quality to determine which one of the first reference clock or the second reference clock has a higher accuracy quality; and
    synchronizing a real time clock to one of the first reference clock or the second reference clock having the higher quality.

2. The method of claim 1, wherein the first neighbor node and the second node are seismic sensors.

3. The method of claim 1, wherein the first neighbor node and the second node are seismic data acquisition network concentrators.

4. The method of claim 1, wherein the first accuracy quality and the second precision quality are based on parts-per-million (PPM) precision.

5. The method of claim 1, wherein the first accuracy quality is based on a number of nodes between the first neighbor node and a node having the first reference clock.

6. The method of claim 5, wherein the second accuracy quality is based on a number of nodes between the second neighbor node and a node having the second reference clock.

7. The method of claim 6, wherein the first accuracy quality is further based on a first unique identifier of the first neighbor node, and wherein the second precision quality is further based on a second unique identifier of the second neighbor node.

8. The method of claim 7, wherein the first unique identifier is a serial number of the first neighbor node, and wherein the second unique identifier is a serial number of the second neighbor node.

9. The method of claim 1, further comprising transmitting to a third neighbor node a third synchronization message having the one of the first accuracy quality and the second accuracy quality with the higher precision quality.

10. The method of claim 9, wherein the third synchronization message is transmitted over the first direct communication link, the second direct communication link or both.

11. A method for configuring a seismic data acquisition network, comprising:
    receiving a synchronization message from a first neighbor node of the seismic data acquisition network over a direct communication link that allows for bidirectional communication of synchronization messages, wherein the synchronization message comprises a first accuracy quality of a clock signal of a first reference clock to which the first neighbor node is synchronized;
    comparing the first accuracy quality with a second accuracy quality of a second reference clock to which a second neighbor node is synchronized to determine which one of the first reference clock or the second reference clock has a higher accuracy quality; and synchronizing a real time clock to the one of the first reference clock to the second reference clock having the higher accuracy quality.

12. The method of claim 11, further comprising:

deactivating the second reference clock if the first accuracy quality is the higher accuracy quality.

13. A method for configuring a seismic data acquisition network, comprising:

receiving a first synchronization message from a first neighbor node of the seismic data acquisition network over a first direct communication link that allows for bidirectional communication of synchronization messages, wherein the first synchronization message comprises a first accuracy quality of a first reference clock to which the first neighbor node is synchronized;

receiving a second synchronization message from a second neighbor node of the seismic data acquisition network over a second direct communication link that allows for bidirectional communication of synchronization messages, wherein the second synchronization message comprises a second accuracy quality of a second reference clock to which the second neighbor node is synchronized;

determining that a third reference clock is deactivated;

determining whether the first direct communication link or the second direct communication link is a valid communication link;

if so, then comparing the first accuracy quality with the second accuracy quality to determine which one of the first reference clock or the second reference clock has a higher accuracy quality; and synchronizing a real time clock to the one of the first reference clock or the second reference clock having the higher accuracy quality.

14. The method of claim 13, further comprising:

if neither the first direct communication link nor the second direct communication link is the valid communication link, then determining whether to activate the third reference clock based on a predetermined amount of time.

15. The method of claim 14, further comprising: if the third reference clock is activated, then synchronizing the real time clock to the third reference clock.

16. A system, comprising:

a first node in a seismic data acquisition network having a first real time clock that is synchronized to a first reference clock;

a second node in the seismic data acquisition network having a second real time clock that is synchronized to a second reference clock; and a third node configured to bidirectionally communicate synchronization messages with the first node and the second node, wherein the third node comprises a third real time clock and wherein the third node comprises a processor and a memory comprising computer-executable instructions executable by the processor to:

receive a first synchronization message from the first node, wherein the first synchronization message comprises a first accuracy quality of the first reference clock;

receive a second synchronization message from the second node, wherein the second synchronization message comprises a second accuracy quality of the second reference clock;

compare the first accuracy quality with the second accuracy quality to determine which one of the first reference clock or the second reference clock has a higher accuracy quality; and synchronize the third real time clock to the one of the first reference clock or the second reference clock having the higher accuracy quality.

17. The system of claim 16, wherein the first node is a source node comprising:

the first reference clock; and wherein the source node is configured to activate or deactivate the first reference clock.

18. The system of claim 16, wherein a fourth node in direct communication with the first node comprises the first reference clock.

19. The system of claim 18, wherein the first accuracy quality is based on a number of nodes between the fourth node and the third node.

20. The system of claim 16, wherein the first synchronization message from the first node comprises a first data packet with a first time value of a first reference clock and wherein the second synchronization message from the second node comprises a second data packet with a second time value of a second reference clock.

* * * * *